April 2, 1940.  W. S. WOLFRAM  2,195,663
FRICTION CLUTCH
Filed Feb. 11, 1938  2 Sheets-Sheet 1

Inventor
William S. Wolfram
By
Blackwood, Spencer & Hint
Attorneys

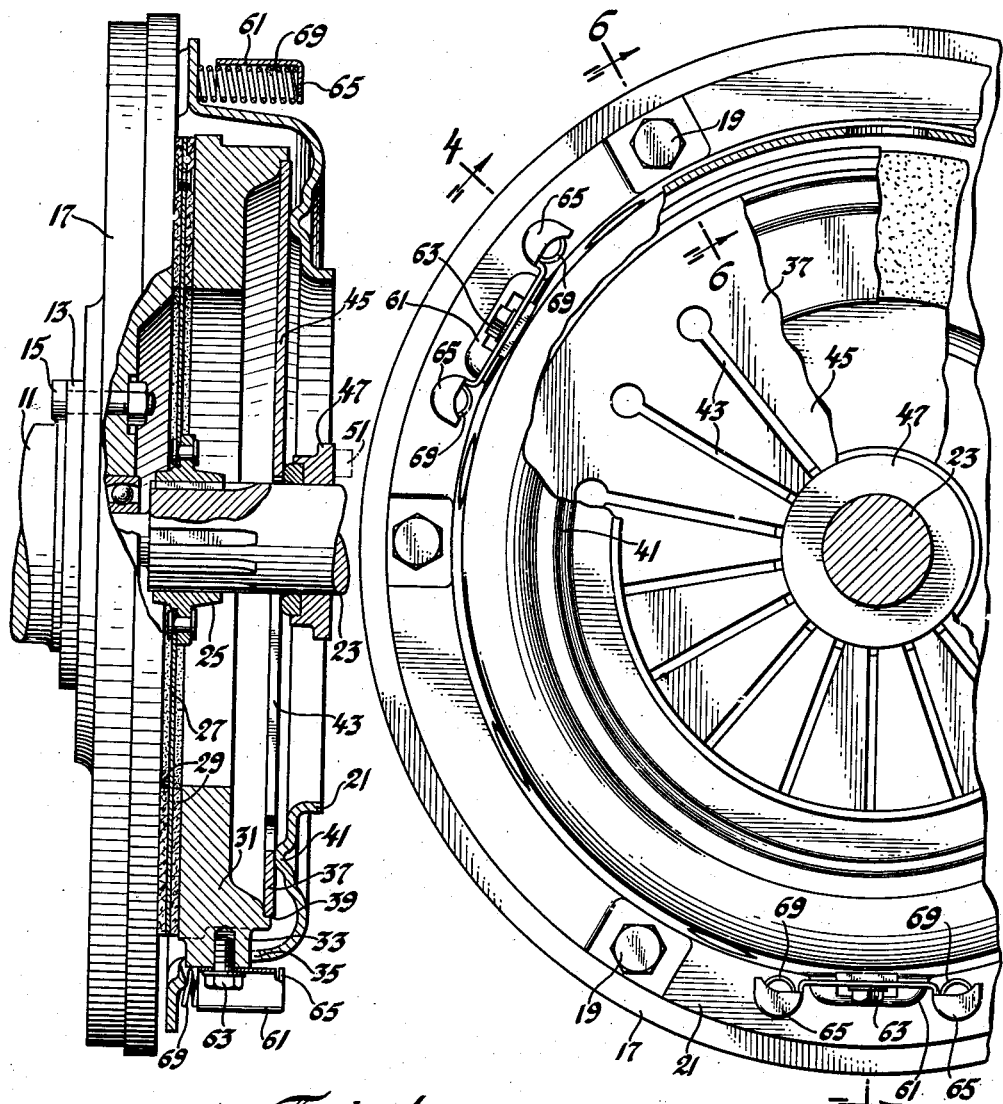

Patented Apr. 2, 1940

2,195,663

UNITED STATES PATENT OFFICE 2,195,663

FRICTION CLUTCH

William S. Wolfram, Dayton, Ohio, assignor to General Motors Corporation, Detroit, Mich., a corporation of Delaware Application February 11, 1938, Serial No. 189,932

8 Claims. (Cl. 192—68)

This invention relates to friction clutches and the embodiments illustrated are intended for use in motor vehicles between the input and output shafts of the main clutch.

One object of the invention is to secure an exceedingly high degree of smoothness in operation.

A second object is to avoid the necessity of spring fingers or tongues bent from the plane of the driven plate, a construction frequently employed.

Another object is to materially reduce the number of parts.

Other objects, such as efficiency in operation and economy in manufacture will be understood from the description.

In the drawings:

Figure 4 is a transverse section of a second embodiment, the section being on line 4—4 of Figure 5.

Figure 5 is a view in elevation of the second form of the invention.

Figure 6 is a sectional view of a detail taken on line 6—6 of Fig. 5.

Figures 1, 2:
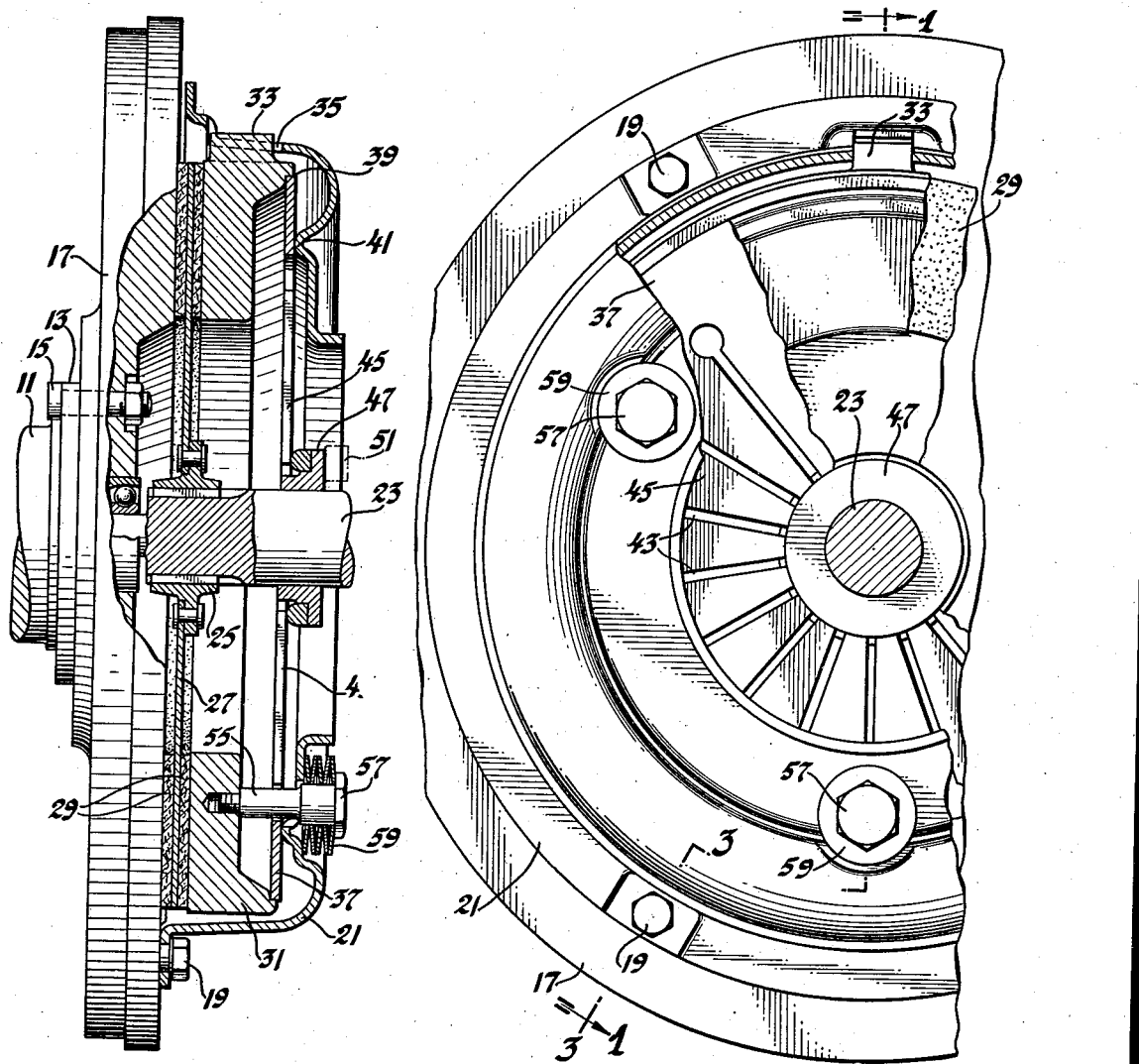
Figure 1 is a transverse section on line 1—1 of Figure 2.
Figure 2 is a view in elevation partly broken away.
Figure 3:
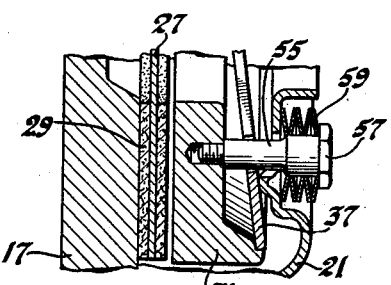
Figure 3 is a section corresponding to a part of Figure 1, but with the parts displaced.

The first embodiment shows an engine shaft 11 having a flange 13 to which is secured by fastening means 15, a flywheel 17. Fastening means 19 secure to the flywheel a cover 21. The clutch driven shaft or transmission shaft is marked 23. It carries a hub 25 to which is secured a driven plate 27 having friction facings 29. A pressure plate 31 has a plurality of lugs 33 received in slots 35 of the cover plate and is adapted to rotate jointly with the flywheel and cover. The part 33 movable in slot 35 permits relative reciprocation. It may be stated that in conventional clutches it has been found desirable and even necessary in order to get the desired smooth action to provide axially directed tongues or fingers bent from the plane of the driven plate, these fingers being generally positioned between the facings and serving to resiliently resist the pressure directed to effect clutch engagement, the spring fingers being then restored to the plane of the plate. Such fingers are always unsatisfactory. They tend to take a set and the resilient cushioning action they afford is then lost. Their use offers a difficulty in mounting the facings against flat surfaces. In the present invention an effort has been made to avoid the necessity for such spring fingers and to secure the axial cushioning means by other instrumentalities, thus making it possible to simplify the structure of the driven disc.

As is usual in vehicle clutches a spring is used between the cover 21 and the pressure plate 31. In the present case as in other recently adopted clutches the spring takes the form of an annular disc 37 which, when unloaded, is of conical form resembling a Belleville washer. When such a Belleville spring has been used heretofore it has been mounted on the cover plate by a plurality of pins carrying rings, washers, etc. By the present invention the large number of parts involved in this known form of spring mounting is avoided. The spring at its periphery engages a shoulder 39 formed at the outer margin of the pressure plate. This shoulder serves to center the spring 37. An annular rib 41 is formed in the cover to engage the spring 37. This rib takes the reaction of the spring when it is wholly or partly flattened in assembly and is exerting pressure on the pressure plate at 39 to force the pressure plate into clutch engaging position. As is the usual practice the clutch spring 37 is formed with radial slots 43 forming spring tongues 45 to provide an easy releasing action. The inner ends of the fingers 45 are engaged by a throwout ring 47. The drawings show at 51 the forked ends of what may be regarded as a conventional throwout lever intended to push the ring 47 to the left in Figure 1 in the act of releasing the clutch.

In prior analogous devices a fulcrum support for the spring was carried by the cover and located on the side of the spring opposite the cover. This support required the large number of parts before mentioned all of which are omitted by the present invention. The omission is made possible by a plurality of spring devices distributed about the clutch. There are preferably three of these devices. A description of one will be sufficient. A stud 55 extends through openings in cover 21 and spring 37 and is threaded into the pressure plate. Under the head 57 of the stud and between the head and the cover are a plurality of rather small oppositely bowed Belleville springs 59. This spring system is positioned so as to be under load when the clutch is released and to be additionally stressed when the clutch is engaged by the action of spring 37.

During clutch engagement the spring 37 holds the driven plate 27 firmly gripped between the flywheel and the pressure plate. The spring 59 possesses potential resilient energy tending to move the pressure plate to the right. Its strength is insufficient to do so inasmuch as the stress of spring 37 is greater. The strength of spring 59 is insufficient to overcome spring 37 and pull the pressure plate away from the driven plate as long as no force is applied to the inner part of spring 37 at 47. Its strength is, however, sufficient to successfully resist the force applied at 47 tending to stress the spring 37 throughout its full radial extent and to relieve its pressure on the pressure plate and on the abutment 41. In so resisting the force applied at 47 the spring 59 moves the pressure plate toward clutch releasing position. In doing so, rib 41 again assumes the full reaction of the pressure of spring 37 on the pressure plate. The progressive movement of ring 47 toward the left accompanied by the movement to the right of the pressure plate under the influence of spring 59 is substantially a continuous operation. When the clutch is again allowed to come into engagement the resilient action of spring 59 opposes the action of spring 37 and the engagement takes place gradually. In this way there is avoided the necessity for the spring fingers in the driven plate referred to above. Inasmuch as the spring 59 cooperates with the shoulder 39 to position the spring 37 the many parts heretofore used for positioning the spring 37 on the cover plate are omitted.

In the second form of the invention similar parts are similarly marked. In this second form the only difference is in the character of the equivalent for spring 59. One or all of the lugs 33 formed on the pressure plate 31 serve for securing thereto by fastening means 63 plates 61. Each plate 61 extends somewhat tangentially and its ends are formed with spring seats 65 within which seats are spring 69 engaging the outermost wall of the cover plate. It will be seen that these springs 69 possess a potential energy always tending to move the pressure plate 31 away from the clutch engaging position but that in the clutch engaging position they are overcome by the spring action of the Belleville plate 37 operating between the shoulder 39 and the rib 41. When the clutch is released as described in connection with the first embodiment of the invention the spring load on rib 41 is intermittently relieved as the ring 47 is moved whereupon the spring 69 moves the pressure plate away from the driven plate as before described.

In this form of invention the spring 69 performs the same functions as did spring 59 of Figure 1. It improves the action of the clutch and by cooperating with the shoulder 39 renders unnecessary the positioning studs for the spring 37 as heretofore used.

I claim:

1. In a clutch, driving means having axially spaced first and second parts and a member positioned between said parts rotatably therewith and axially reciprocable relative thereto, driven means between said first part and said member, and an annular coned spring disc between and engaging said second part and said member to cause said driven means to be gripped, and yieldable means operably related to the second part and said member acting resiliently to oppose the action of the spring disc, said yieldable means comprising a headed pin carried by said member and extending through said second part and a plurality of oppositely bowed collapsible discs between said second part and the head of said headed pin.

2. In a clutch, driving means having axially spaced first and second parts and a member positioned between said parts rotatably therewith and axially reciprocable relative thereto, driven means between said first part and said member, and an annular coned spring disc between and engaging said second part and said member to cause said driven means to be gripped, and yieldable means operably related to the second part and said member acting resiliently to oppose the action of the spring disc, said member having a lug extending through said second part, a bracket secured to said lug, said bracket formed with a spring abutment, and a spring between said abutment and said second part.

3. In a clutch, driving means having axially spaced first and second parts and a member positioned between said parts rotatably therewith and axially reciprocable relative thereto, driven means between said first part and said member, and an annular coned spring disc between and engaging said second part and said member to cause said driven means to be gripped, and yieldable means operably related to the second part and said member acting resiliently to oppose the action of the spring disc, said member having a lug extending radially through said second part, a bracket secured to the radial extremity of said lug, said bracket extending tangentially in both directions from its point of attachment and having spring abutments at its ends and coil springs between said abutments and said second part.

4. In a clutch, driving means including a pressure plate and a fixed abutment, a Belleville spring engaging and adapted to move said pressure plate and reacting against said abutment, manually operated means movable to take the reaction of said Belleville spring from said abutment, and reduce its influence upon the pressure plate and prestressed spring means to move the pressure plate toward said abutment when the spring load of the Belleville spring is reduced and to restore the reaction of said Belleville spring to the abutment.

5. The invention defined by claim 4, said pressure plate having an annular shoulder engaged by said Belleville spring whereby the Belleville spring is held in position solely by its engagement with said shoulder and its contact with said abutment under the influence of said prestressed spring.

6. In a clutch, an abutment plate, a pressure plate, a Belleville spring reacting on said abutment plate and operable to move said pressure plate to clutch engaging position and other spring means operably associated with said plates and acting resiliently to produce smooth clutch engagement, to maintain said Belleville spring in contact with said abutment and to thereby hold said Belleville spring in centralized position.

7. In a clutch, a Belleville spring to effect clutch engagement, spring means potentially energized to bias said clutch to its position of release, and means operable to change the mechanical advantage of said spring means whereby said spring means may overcome said Belleville spring and release the clutch.

8. The invention defined by claim 7, said clutch having a fixed abutment normally to receive the reaction of said Belleville spring, said last named means acting to take the reaction of said Belleville spring from said abutment.

WILLIAM S. WOLFRAM.